US010268385B2

(12) United States Patent
Huang et al.

(10) Patent No.: US 10,268,385 B2
(45) Date of Patent: Apr. 23, 2019

(54) GROUPED TRIM BITMAP

(71) Applicant: SK Hynix Inc., Gyeonggi-do (KR)

(72) Inventors: Szutao Huang, Pleasanton, CA (US); Chris Lin, San Jose, CA (US)

(73) Assignee: SK Hynix Inc., Gyeonggi-do (KR)

( * ) Notice: Subject to any disclaimer, the term of this patent is extended or adjusted under 35 U.S.C. 154(b) by 97 days.

(21) Appl. No.: 15/390,268

(22) Filed: Dec. 23, 2016

(65) Prior Publication Data

US 2017/0322728 A1 Nov. 9, 2017

Related U.S. Application Data

(60) Provisional application No. 62/331,308, filed on May 3, 2016.

(51) Int. Cl.
| G06F 3/06 | (2006.01) |
| G06F 12/06 | (2006.01) |
| G06F 12/02 | (2006.01) |

(52) U.S. Cl.
CPC ............ G06F 3/061 (2013.01); G06F 3/0614 (2013.01); G06F 3/0638 (2013.01); G06F 3/0679 (2013.01); G06F 12/0246 (2013.01); G06F 12/0638 (2013.01); G06F 2212/205 (2013.01); G06F 2212/7201 (2013.01)

(58) Field of Classification Search
None
See application file for complete search history.

(56) References Cited

U.S. PATENT DOCUMENTS

| 2004/0205301 A1* | 10/2004 | Hara ................... G06F 12/0862 711/137 |
| 2007/0204128 A1* | 8/2007 | Lee ..................... G06F 12/0246 711/173 |
| 2008/0189473 A1* | 8/2008 | Murray ............... G06F 12/0246 711/103 |
| 2009/0132764 A1* | 5/2009 | Moll .................... G06F 1/3203 711/118 |
| 2011/0296131 A1* | 12/2011 | Yim .................... G06F 12/0246 711/165 |

(Continued)

*Primary Examiner* — Midys Rojas
*Assistant Examiner* — Khoa D Doan
(74) *Attorney, Agent, or Firm* — Kilpatrick Townsend & Stockon

(57) ABSTRACT

Techniques and systems are provided for tracking commands. Such methods and systems can include receiving a data access request in a controller coupled to (a) a non-volatile memory configured to store a set of physical data pages, and (b) a volatile memory configured to store a plurality of physical data page addresses, wherein each physical data page address corresponding to a physical data page in the set of physical data pages, and each physical data page address is accessed via a corresponding logical address in a set of logical addresses; accessing, by the controller based on the received data access request, a bitmap stored on the volatile memory, the bitmap including a set of bits, each bit configured to indicate a validity state of a different plurality of logical addresses in a set of logical addresses; and determining, via the controller, an invalid state of at least one of a selected (a) logical address, or (b) plurality of logical addresses, based on a bit in the bitmap.

18 Claims, 4 Drawing Sheets

(56) References Cited

U.S. PATENT DOCUMENTS

| | | | |
|---|---|---|---|
| 2012/0151124 A1* | 6/2012 | Baek | G06F 12/0246 |
| | | | 711/103 |
| 2013/0031293 A1* | 1/2013 | Van Riel | G06F 12/10 |
| | | | 711/6 |
| 2013/0132650 A1 | 5/2013 | Choi et al. | |
| 2013/0151754 A1* | 6/2013 | Post | G06F 12/0246 |
| | | | 711/103 |
| 2013/0191565 A1* | 7/2013 | Tal | G06F 3/061 |
| | | | 710/74 |
| 2013/0246722 A1* | 9/2013 | Suzuki | G06F 3/0608 |
| | | | 711/162 |
| 2013/0275692 A1* | 10/2013 | Kwok | G06F 12/0246 |
| | | | 711/156 |
| 2014/0047210 A1* | 2/2014 | Cohen | G06F 12/00 |
| | | | 711/202 |
| 2014/0164730 A1 | 6/2014 | Gold et al. | |
| 2015/0012689 A1 | 1/2015 | Atkinsson et al. | |
| 2015/0301934 A1* | 10/2015 | Baderdinni | G06F 3/0631 |
| | | | 711/103 |
| 2017/0262175 A1* | 9/2017 | Kanno | G06F 3/061 |

\* cited by examiner

GROUPED TRIM BITMAP

CROSS-REFERENCE TO RELATED APPLICATIONS

The present application claims priority to Provisional Application No. 62/331,308 entitled "Grouped Trim Bitmap," filed May 3, 2016, which is assigned to the assignee hereof and expressly incorporated by reference herein in its entirety.

FIELD

The present invention relates generally to systems, methods and apparatus for storage devices, and specifically to improving performance of non-volatile memory devices.

BACKGROUND

Non-volatile memory devices such as Solid State Drives (SSDs) are finding new applications in consumer electronics. For example, they are replacing Hard Disk Drives (HDDs), which typically comprise rapidly rotating disks (platters). Non-volatile memories, sometimes referred to as 'flash memories' (for example, NAND and NOR flash devices), are used in media storage, cameras, mobile phones, mobile computers, laptop computers, USB flash drives, etc.

Non-volatile memory provides a relatively reliable, compact, cost-effective, and easily accessible method of storing data when the power is off.

Non-volatile memory controllers, such as flash memory controllers, are used to manage the data stored in the non-volatile memory, and to act as an interface between a host and the non-volatile memory. A flash memory controller can include a Flash Translation Layer (FTL) that maps the host side logical addresses such as "logical block addresses" (LBAs) to the flash memory side "physical addresses" which correspond to physical locations. A mapping between the logical addresses and the physical addresses can change during operating of the system for various reasons including flash management.

During operation, a host system may request deletion of certain data stored on the non-volatile memory. Such deletion requests may result in invalidation commands from the host system to the non-volatile storage device for specific LBAs. These invalidation commands are intended to mark the data stored at these LBAs as invalid, or "Trim". However, in practice, the data corresponding to that LBA may not be physically erased—the LBA, or a Bitmap table corresponding to the LBA, may be simply marked as invalid. If the data in the physical address corresponding to the invalid LBA or its Bitmap table is subsequently read, it can contain data previously present. Returning previously erased data can be undesirable, or may not meet specifications because it may pose a security threat in a number of situations.

A traditional Trim Bitmap typically resides in volatile memory, such as Dynamic Radom Accessible Memory (DRAM), and uses 1 bit per each LBA, with the Trim Bitmap size growing in direct proportion to the SSD capacity. When the Trim Bitmap size grows, it may not be possible to save the entire Trim Bitmap to non-volatile memory (e.g. NAND) during sudden power loss (SPL). As a result, it increases the difficulty for rebuilding process to maintain the accuracy of the Trim Bitmap after power loss. It also increases the processing overheads of Trim Bitmap journaling. Exemplary embodiments of the disclosure address these problems, both individually and collectively.

SUMMARY

Certain embodiments are described for grouping trim bitmaps. An exemplary embodiment includes receiving a data access request in a controller coupled to (a) a non-volatile memory configured to store a set of physical data pages, and (b) a volatile memory configured to store a plurality of physical data page addresses, wherein each physical data page address corresponding to a physical data page in the set of physical data pages, and each physical data page address is accessed via a corresponding logical address in a set of logical addresses; accessing, by the controller based on the received data access request, a bitmap stored on the volatile memory, the bitmap including a set of bits, each bit configured to indicate a validity state of a different plurality of logical addresses in a set of logical addresses; and determining, via the controller, an invalid state of at least one of a selected (a) logical address, or (b) plurality of logical addresses, based on a bit in the bitmap.

Another exemplary embodiment includes an apparatus having a non-volatile memory configured to store a set of physical data pages; a volatile memory configured to store (a) a plurality of physical data page addresses, wherein each physical data page address corresponding to a physical data page in the set of physical data pages, and each physical data page address is accessed via a corresponding logical address in a set of logical addresses; and (b) a bitmap including a set of bits, each bit configured to indicate a validity state of a different plurality of logical addresses in the set of logical addresses; and a controller coupled to the volatile memory and the non-volatile memory and configured to determine an invalid state of at least one of a selected (a) logical address, or (b) plurality of logical addresses, based on a bit in the bitmap.

Another exemplary embodiment includes a computer readable medium having stored thereon instructions that when executed by a processor perform a method, including receiving a data access request in a controller coupled to (a) a non-volatile memory configured to store a set of physical data pages, and (b) a volatile memory configured to store a plurality of physical data page addresses, wherein each physical data page address corresponding to a physical data page in the set of physical data pages, and each physical data page address is accessed via a corresponding logical address in a set of logical addresses; accessing, by the controller based on the received data access request, a bitmap stored on the volatile memory, the bitmap including a set of bits, each bit configured to indicate a validity state of a different plurality of logical addresses in a set of logical addresses; and determining, via the controller, an invalid state of at least one of a selected (a) logical address, or (b) plurality of logical addresses, based on a bit in the bitmap.

BRIEF DESCRIPTION OF THE DRAWINGS

Aspects of the disclosure are illustrated by way of example. In the accompanying figures, like reference numbers indicate similar elements.

DETAILED DESCRIPTION

Figure 1:
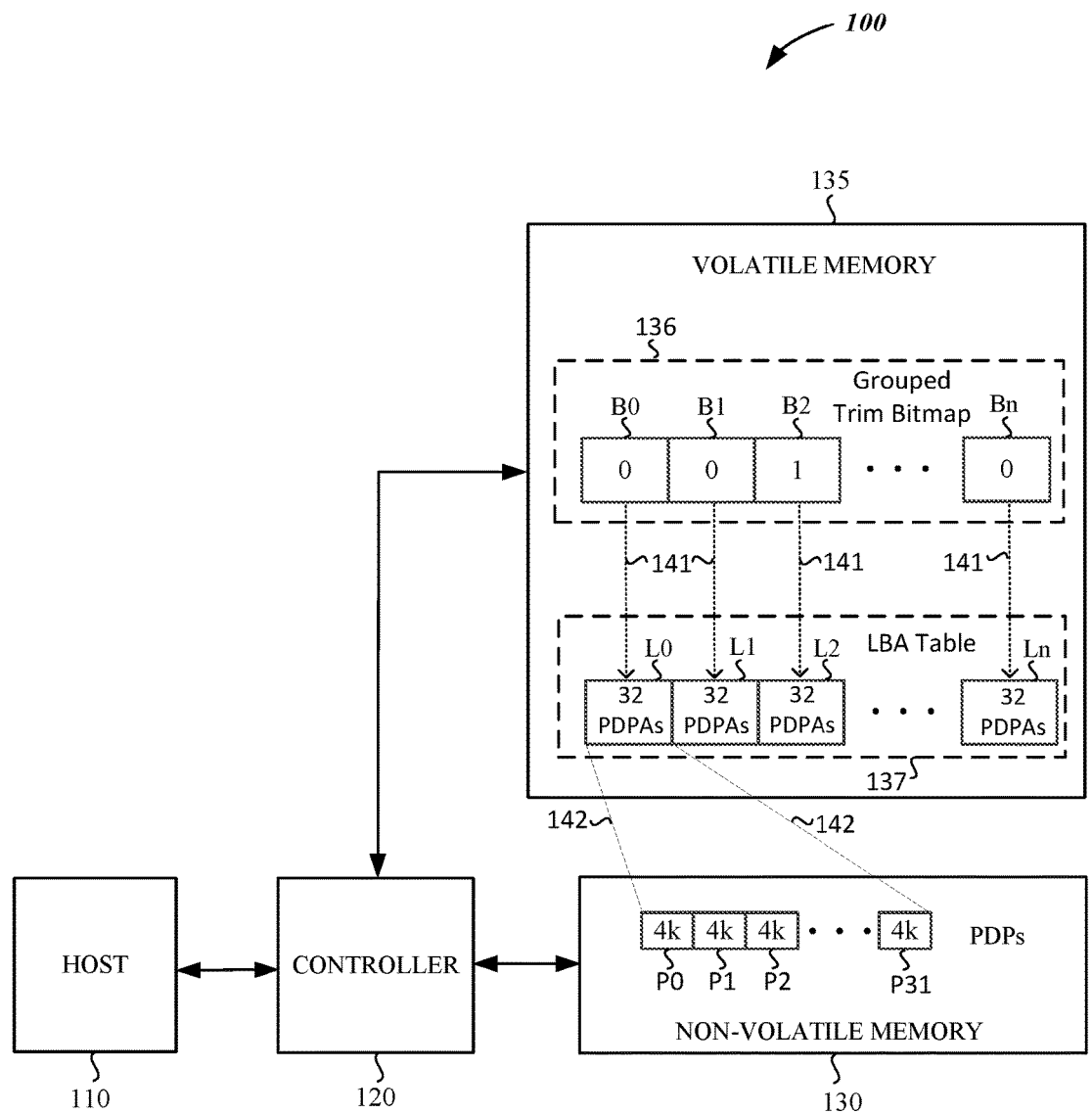
FIG. 1 is a block diagram illustrating a system including a host, a controller, a volatile memory, and a non-volatile memory according to exemplary embodiments.

Certain aspects and embodiments of this disclosure are provided below. Some of these aspects and embodiments may be applied independently, or in combination, as would be apparent to those of skill in the art. In the following description, for the purposes of explanation, specific details are set forth in order to provide a thorough understanding of embodiments. However, it will be apparent that various embodiments may be practiced without these specific details. The figures and description are not intended to be restrictive.

The ensuing description provides examples, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a functional return to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like. The terms "machine-readable medium" and "computer-readable medium," as used herein, refer to any medium that participates in providing data that causes a machine to operate in a specific fashion. While illustrative embodiments of the application have been described in detail herein, it is to be understood that the inventive concepts may be otherwise variously embodied and employed, and that the appended claims are intended to be construed to include such variations, except as limited by the prior art.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

The following detailed description together with the accompanying drawings in which the same reference numerals are sometimes used in multiple figures to designate similar or identical structures structural elements, provide a better understanding of the nature and advantages of the present invention.

FIG. 1 is a simplified block diagram illustrating a system 100 in which exemplary embodiments of the disclosure may be implemented. As shown, system 100 includes a host 110, a controller 120, volatile memory 135, such as Dynamic Random Access Memory (DRAM), and non-volatile memory 130, such as NAND flash memory or NOR flash memory configured to interact externally as a NAND flash memory. In embodiments, non-volatile memory 130 can be designed to store data in the absence of a continuous or substantially continuous external power supply. In some examples, non-volatile memory 130 can be used for secondary data storage, for example, in a computer system such as a laptop. In such examples, a non-volatile memory system 130 can replace a hard disk drive (HDD). In some examples, controller 120 can be external to non-volatile memory system 130. In some such examples, controller 120 can interact with a plurality of non-volatile memories. The architecture and organization of an example non-volatile memory 130 will be provided later in the specification. Other examples of non-volatile memory 130 can include read only memory (ROM), a mask ROM (MROM), a programmable ROM (PROM), an erasable programmable ROM (EPROM), an electrically erasable programmable ROM (EEPROM), Ferroelectric RAM (F-RAM), Magnetoresistive RAM (RAM), polymer-based organic memory, holographic memory, phase change memory and the like.

Host 110 can include any appropriate hardware device, software application, or a combination of hardware and software. In some embodiments, host 110 can include a host-side controller (not shown). In exemplary embodiments, controller 120 is coupled to and interfaces between host 110, volatile memory 135 and non-volatile memory 130.

As shown in FIG. 1, non-volatile memory 130 is configured to store a set of physical data pages (PDP), such as P0-P31, in which actual data is stored, such as in four Kilobytes sizes. Volatile memory 135 includes an LBA table 137 which includes a plurality (i.e. set) of physical data page addresses (PDPAs), such as in subsets of 32 PDPAs, wherein each PDPA plurality (i.e. each PDPA subset in the set) is accessed via a corresponding logical address (or plurality of logical addresses), such as L0 or L1, in a set of logical addresses, such as L0-Ln. As described later and in greater detail in conjunction with FIG. 2, each PDPA corresponds to a PDP, such as P0, in the set of PDPs, and therefore each set of 32 PDPAs in LBA table 137 correspond to 32 PDPs in non-volatile memory 130, as shown symbolically via arrows 142 in FIG. 1.

Volatile memory 135 further includes a Grouped Trim Bitmap (GTB) 136, having a set of bits B0, B1, B2 Bn. As described later and in greater detail in conjunction with FIG. 2, each bit B0-Bn in GTB 136 corresponds to (shown symbolically via arrows 141) and is configured to indicate a validity state (e.g. valid or invalid state) of a different plurality of logical addresses, such as L0 or L1, in the set of logical addresses, such as a set that includes L0-Ln, in LBA table 137.

Controller 120 is coupled to and interfaces with the volatile memory 135 and the non-volatile memory 130, such as for retrieving/storing data from/to PDPs. Controller 120 is configured to determine an invalid state of a selected (a) logical address (LA) (shown later in FIG. 2), or (b) plurality of logical addresses (LAs), such as L0 or L1 based on a corresponding bit in GTB 136, as described later and in greater detail in conjunctions with FIG. 2. In an exemplary embodiment, the controller 120 includes a flash memory controller configured to store GTB 136 to non-volatile memory 130 in the event of a power-loss.

Figure 2:
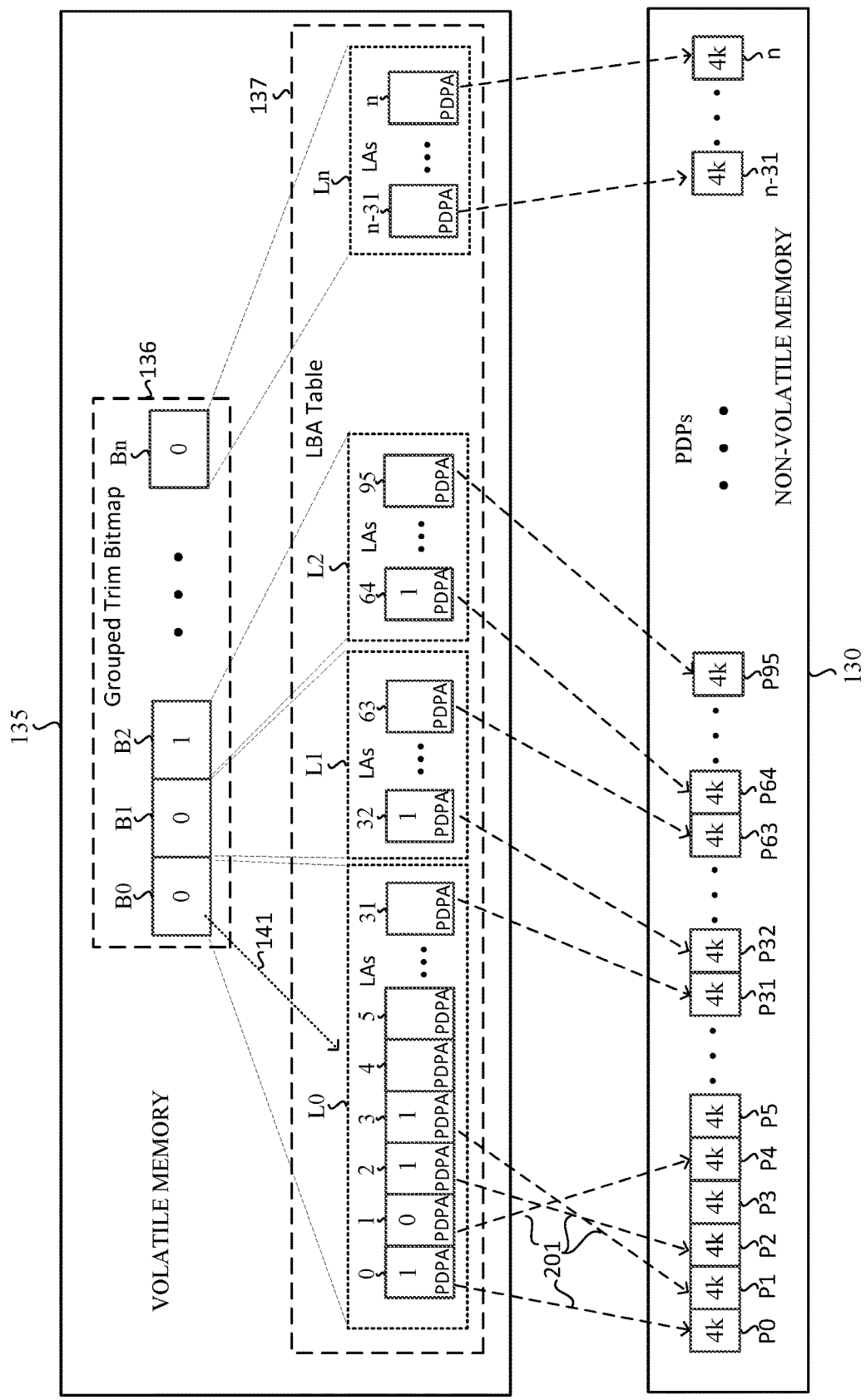
FIG. 2 illustrates memory mappings, according to exemplary embodiments.

FIG. 2 further illustrates memory mappings of FIG. 1, as well as other exemplary embodiments. As shown in FIG. 2, the logical addresses in LBA Table 137, such as 0 to n, are partitioned into sequentially numbered logical addresses subsets, such as L0, L1, L2 . . . Ln, each having a fixed plurality, such as 32, of sequentially numbered logical addresses, such as 0-31 for L0, 32-63 for L1, 64-95 for L2, etc. The bits in GTB 136 are also sequentially numbered bits, such as B0, B1, B2 Bn, with each bit corresponding to a logical addresses subset. For example, B0 corresponds to L0, B1 to L1, B2 to L2, etc. As such, bits B0, B1, B2 Bn, are grouped in GTB 136 with each bit used to represent a logical addresses subset representing 32 logical addresses, such as L0, with each of 0-31 addresses in L0, such as address 0, corresponding to a PDP, such as P0, via a PDPA as symbolically shown by arrow(s) 201. In an exemplary embodiment, L0's size is configurable for each capacity. If the L0's size is set to 32 as in the shown example, then each bit B0-Bn represents an L0's having 32 contiguous grouped logical addresses, and so 1 Terabyte capacity will need only 1 Megabyte (MB) space for GTB 136, as compared to 32 MB in a traditional Trim Bitmap. Since GTB 136 size is now relatively small, a firmware doesn't need to do the Trim Bitmap journaling in background. The firmware has enough time to save the whole GTB 136 during power loss that may also help reduce the rebuild time after power up (SPOR—Sudden Power Off Recovery.)

As described in greater detail below in conjunction with FIG. 3, a value of 1 in a bit in GTB 136, such as shown in B2, indicates an invalid (i.e. Trim) state of the corresponding L2, which means actual data stored in PDPs P64-P95 corresponding to L2 are either deleted, or marked for deletion, and therefore will not be retrieved upon receipt of a request for their data. In an exemplary embodiment, random or invalid data might then be returned instead.

Figure 3:
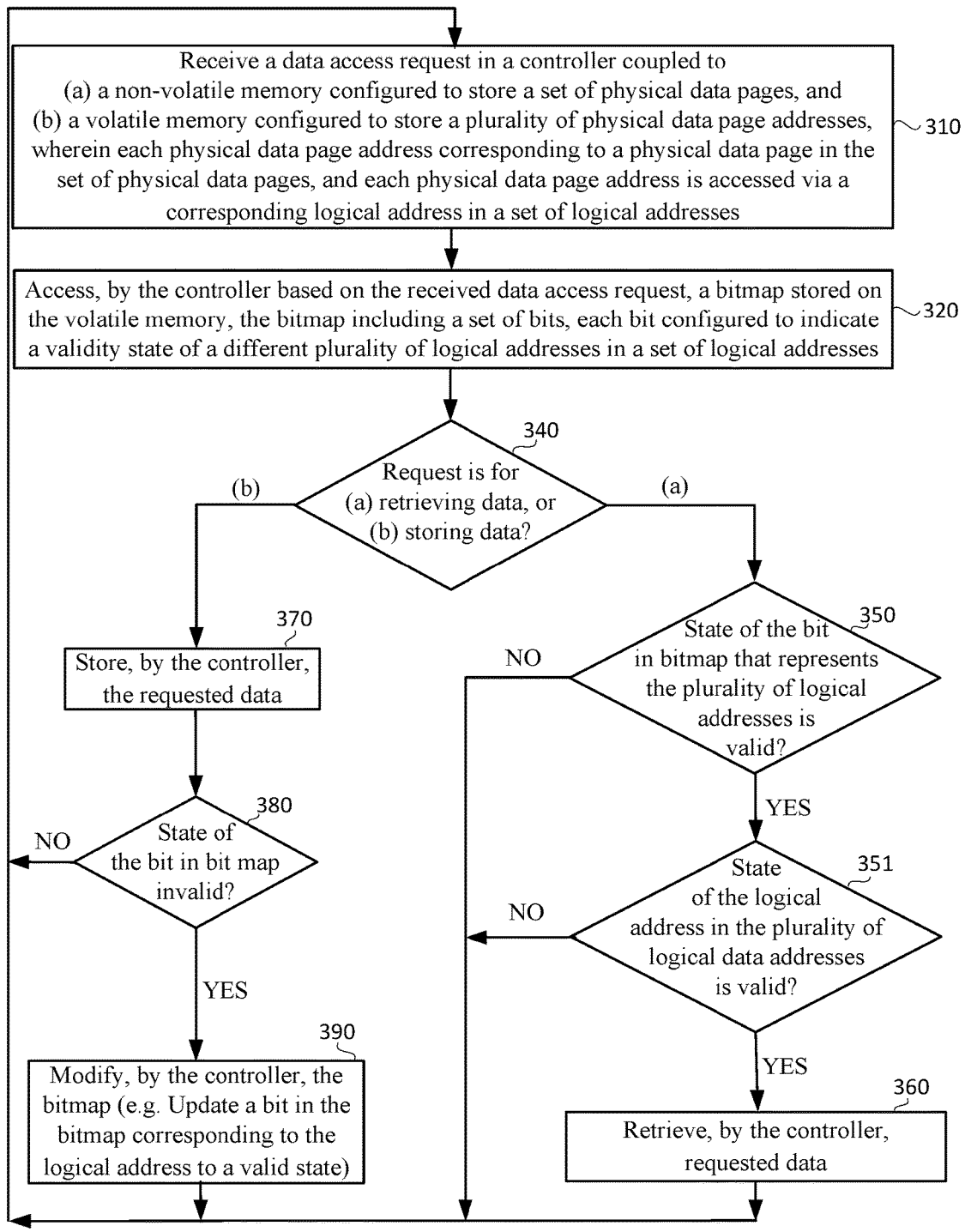
FIG. 3 is a flowchart illustrating a process performed by a controller, according to exemplary embodiments.

FIG. 3 is a flowchart that illustrates a process performed by a controller 120, according to example embodiments in FIG. 1 and FIG. 2. As shown in FIG. 3, an example process flow may begin at block 310, in which the controller 120 receives data access request (i.e. Write or Read operations) to one or more physical data pages, such as P0, of non-volatile memory 130.

Next, in blocks 320, the controller 120 based on the received data access request, accesses from volatile memory GTB 136.

Next, in decision block 340, the controller 120 determines if the request in block 310 is for storing data or retrieving data. In one example, in block 310 the controller 120 receives a request for storing data to a requested PDP, and so following blocks 320 and 340 the flow proceeds to block 370 wherein the controller 120 stores the incoming data in the requested PDP, such as in P0. Then, in decision block 380, the controller 120 determines if the state of the bit B0 corresponding to L0 (which corresponds to P0) is valid (i.e. non-trimmed). Since the value of B0 in this case is a 0, indicating a valid state, the flow is then returned to block 310 for processing of any additional received requests.

In another example, process flow may begin at block 310, in which the controller 120 receives a request for storing data to a requested PDP, such as P64, of non-volatile memory 130. Following blocks 320 and 340 in the manner described above, in block 370 the controller 120 stores the incoming data in the requested PDP, such as in P64. The controller 120 then, in decision block 380, determines if the state of bit B2, which corresponds to L2, is valid. Since the value of B2 in this case is a 1, indicating an invalid (i.e. Trimmed) state, the controller 120 then in block 390 modifies GTB 136 by updating the value in B2 from 1 to 0, so to indicate a now valid state of B2, which allows for future reading of data from P64. The flow is then returned to block 310 for processing of any additional received requests.

In another example, process flow may begin at block 310 in which the controller 120 receives a request for retrieving data (i.e. Read operation) from one or more PDPs, such as P64 of non-volatile memory 130. Following block 320 in the manner described above, in decision block 340, the controller 120 determines the request in block 310 is for retrieving data and so the flow proceeds to decision block 350 in which the controller 120 determines if state of the bit B2 (which represents L2 in GTB 136) is valid. Since, as shown in FIG. 3, the value of B2 is 1, indicating an invalid (i.e. Trimmed) state, the request for retrieving data is then not performed, and the flow is returned to block 310 for processing of any additional received requests. In this way, the entire L2, representing 32 PDPAs therein, can be indicated as invalid via a single bit having a value of 1 in the GTB 136.

In another example, process flow may begin at block 310 in which the controller 120 receives a request for retrieving data (i.e. Read operation) from P1 of non-volatile memory 130. Following blocks 320 and 340 in the manner described above, the flow proceeds to block 350 in which the controller 120 determines if state of the bit B0 (which represents the L0 in GTB 136) is valid. Since, as shown in FIG. 3, the value of B0 is 0, indicating a valid (i.e. non-Trimmed) state, the flow proceeds to decision block 351 in which the controller 120 determines a valid state of the individual logical address 3 in L0 which corresponds to P1. Since, as shown in FIG. 3, the value corresponding to logical address 3 is 1, indicating an invalid (i.e. Trimmed) state, the request for retrieving data is then not performed, and the flow is returned to block 310 for processing of any additional received requests. Alternatively, an invalid state can be indicated if no corresponding PDPA is found at the logical address 3.

In another example, process flow may begin at block 310 in which the controller 120 receives a request for retrieving data (i.e. Read operation) from P4 of non-volatile memory 130.

Following blocks 320, 340 and 350 in the manner described above the flow proceeds to decision block 351 in which the controller 120 determines a valid state of the individual logical address 1 in L0 which corresponds to P4. Since, as shown in FIG. 3, the value of logical address 1 is 0, indicating a valid (i.e. non-Trimmed) state, the flow proceeds to block 360 in which the request for retrieving data from P4 is performed. The flow is then returned to block 310 for processing of any additional received requests.

Figure 4:
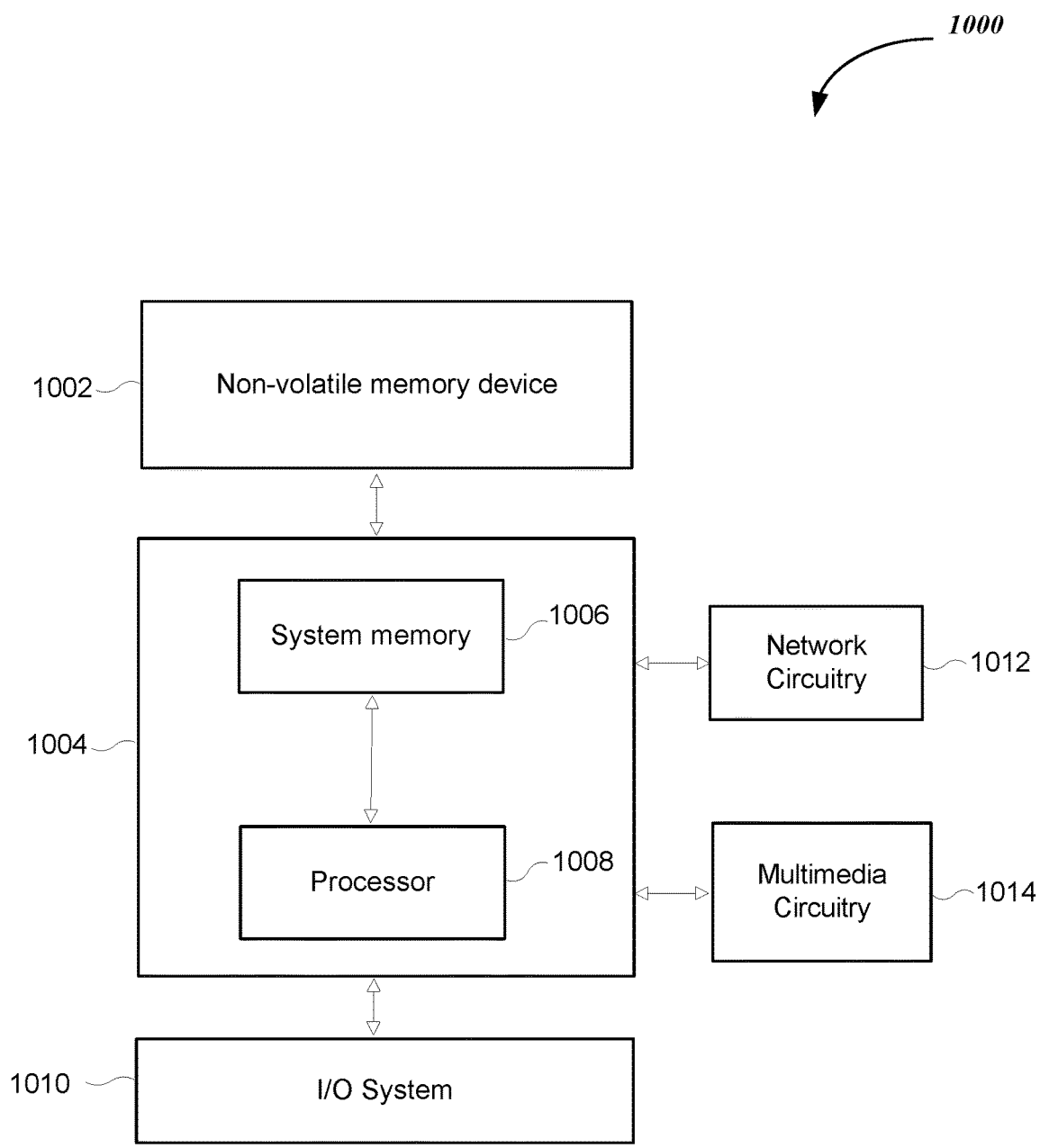
FIG. 4 is a simplified illustration of an exemplary host computer device.

FIG. 4 illustrates an example computing device 1000 comprising embodiments of the invention. Hardware elements of device 1000 can be electrically coupled via a bus (or may otherwise be in communication, as appropriate). As shown in FIG. 4, computing device 1000 includes processing unit 1004, non-volatile memory device 1002, an input/output (I/O) system 1010, network circuitry 1012, and multimedia circuitry 1014. In the example depicted, processing unit 1004 can act as a host system.

In examples, non-volatile memory device 1002 can be a NAND flash memory device and can be used to store secondary data accessed by processing unit 1004. Non-volatile memory device 1002 can include a controller 120 (shown in FIG. 1) according to embodiments described above, acting as an interface between non-volatile memory device 1002, such as the non-volatile memory 130 shown in FIG. 1 and the processing unit 1004. System memory 1006 can be a volatile memory such as a Random Access Memory (RAM) and can operate in conjunction with processor 1008. Processor 1008 can include, without limitation one or more general-purpose processors and/or one or more special-purpose processors (such as digital signal processing chips, graphics acceleration processors, and/or the like.)

Computing device 1000 can further include network circuitry 1012 to connect computing device 1000 to a network. The network circuitry can include without limitation a modem, a network card (wireless or wired), an infrared communication device, a wireless communication device and/or chipset (such as a Bluetooth™ device, an 1602.11 device, a WiFi device, a WiMax device, cellular communication facilities, etc.), and/or the like. Network circuitry 1012 may permit data to be exchanged with a network, other devices, and/or any other devices described herein.

As shown in FIG. 4, computing device 1000 can include multimedia circuitry 1014. Multimedia circuitry 1014 can connect computing device 1000 to several external audio and video input and output, such as displays and speakers. I/O system 1010 can connect computing device 1000 to various input devices and mechanisms such as keyboards, mice, touchscreens, cameras, infra-red capture devices, and the like, and output devices and mechanisms such as a printer, a display unit, a haptic feedback device, and/or the like.

Device 1000 also can comprise software elements, located within system memory 1006 or in non-volatile memory 1002, including device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device such as controller 120) to perform one or more operations in accordance with the described methods, for example the method illustrated in FIG. 3.

A set of these instructions and/or code might be stored on a computer-readable storage medium, such as the non-volatile memory device 1002, within controller 120 described above. In some cases, the storage medium might be incorporated within a device, such as device 1000 or controller 120. In other embodiments, the storage medium might be separate from a device (e.g., a removable medium, such as a compact disc), and/or provided in an installation package, such that the storage medium can be used to program, configure and/or adapt a general purpose computer with the instructions/code stored thereon. These instructions might take the form of executable code, which is executable by a device and/or might take the form of source and/or installable code, which, upon compilation and/or installation on a device (e.g., using any of a variety of generally available compilers, installation programs, compression/decompression utilities, etc.) then takes the form of executable code.

Substantial variations may be made based on specific requirements. For example, customized hardware might also be used, and/or particular elements might be implemented in hardware, software (including portable software, such as applets, etc.), or both. Further, connection to other computing devices such as network input/output devices may be employed.

It is understood that the specific order or hierarchy of steps in the processes disclosed is an illustration of exemplary approaches, and may be rearranged based upon design preferences. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Moreover, nothing disclosed herein is intended to be dedicated to the public.

While some examples of methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes one or more computer-executable program instructions stored in memory. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

What is claimed is:

1. A device, comprising:
a non-volatile memory configured to store a set of physical data pages;
a volatile memory configured to store (a) a plurality of physical data page addresses, wherein each physical data page address corresponding to a physical data page in the set of physical data pages, and each physical data page address is accessed via a corresponding logical address in a set of logical addresses; and (b) a bitmap including a set of bits, each bit configured to indicate a validity state of a different plurality of logical addresses in the set of logical addresses; and
a controller coupled to the volatile memory and the non-volatile memory and configured to determine a validity state of a logical address by:
determining the validity state of a bit in a bitmap that represents a selected plurality of logical addresses that includes the logical address; and
determining the validity state of the logical address in the selected plurality of logical addresses.

2. The device of claim 1, wherein the controller is further configured to:
receive a request for retrieving data from the physical data pages corresponding to the physical data address accessed via the corresponding selected logical address; and
retrieve the requested data based on determination of a valid state of the bit from the bit map and a valid state of the selected logical address.

3. The device of claim 1, wherein the controller is further configured to:
receive a request for storing data to a physical data pages accessed via a second corresponding logical address;
store the requested data based on determination of an invalid state of the bit from the bit map; and
update a bit in the bitmap corresponding to the second logical address to a valid state.

4. The device of claim 1, wherein the controller is further configured to:
receive a request for storing data to the physical data pages accessed via the corresponding logical address; and
store the requested data based on determination of a valid state of the corresponding logical address.

5. The device of claim 1, wherein the controller is further configured to store the bitmap to non-volatile memory in the event of a power-loss.

6. The device of claim 1, wherein the set of logical addresses are partitioned into sequentially numbered subsets, wherein each subset comprising a fixed plurality of sequentially numbered logical addresses, wherein the bits in the bitmap are sequentially numbered bits, each bit corresponding to a different fixed plurality of sequentially numbered logical addresses.

7. The device of claim 1, wherein the non-volatile memory comprising a flash memory and wherein the controller comprising a flash memory controller.

8. The device of claim 1, wherein the controller is further configured to modify the bitmap based on the determination.

9. The device of claim 1, wherein an invalid state of a plurality of logical addresses corresponds to a trimmed state of the plurality of logical pages.

10. The device of claim 9, wherein the trimmed state of the selected logical address is indicated by at least one predetermined invalid value corresponding to (a) the selected logical address for a physical data page address, or (b) the corresponding bit in the bitmap.

11. A method comprising:
receiving a data access request in a controller coupled to (a) a non-volatile memory configured to store a set of physical data pages, and (b) a volatile memory configured to store a plurality of physical data page addresses, wherein each physical data page address corresponding to a physical data page in the set of physical data pages, and each physical data page address is accessed via a corresponding logical address in a set of logical addresses;
accessing, by the controller based on the received data access request, a bitmap stored on the volatile memory, the bitmap including a set of bits, each bit configured to indicate a validity state of a different plurality of logical addresses in a set of logical addresses; and determining, via the controller, a valid state of a logical address by:
  determining the validity state of a bit in a bitmap that represents a selected plurality of logical addresses that includes the logical address; and
  determining the validity state of the logical address in the selected plurality of logical addresses.

12. The method of claim 11, wherein the received data access request is for retrieving data from the physical data pages corresponding to the physical data address accessed via the corresponding selected logical address; wherein the method further comprising:
  determining, by the controller, a valid state of the bit from the bit map and a valid state of the selected logical address; and
  retrieving, by the controller, the requested data based on the determining the valid state of the bit from the bit map and the valid state of the selected logical address.

13. The method of claim 11, further comprising:
  receiving, by the controller, a request for storing data to a physical data page accessed via a second logical address;
  determining, by the controller, an invalid state of the bit from the bit map;
  storing, by the controller, the requested data based on determination of an invalid state of the bit from the bit map; and
  updating, by the controller, a bit in the bitmap corresponding to the second logical address to a valid state.

14. The method of claim 11, wherein the received data access request is for storing data to the physical data pages accessed via the corresponding logical address; wherein the method further comprising:
  receiving, in the controller, a request
  determining, by the controller, a valid state of the corresponding logical address; and
  storing, by the controller, the requested data based on the determining of the valid state of the corresponding logical address.

15. The method of claim 11, further comprising:
  storing, by the controller, the bitmap to non-volatile memory in the event of a power-loss.

16. The method of claim 11, further comprising:
  modifying, by the controller, the bitmap based on the determining the validity state of the selected logical address in the selected plurality of logical addresses.

17. The method of claim 11, wherein the set of logical addresses are partitioned into sequentially numbered subsets, wherein each subset comprising a fixed plurality of sequentially numbered logical page addresses, wherein the bits in the bitmap are sequentially numbered bits, each bit corresponding to a different fixed plurality of sequentially numbered logical page addresses.

18. A non-transitory computer readable medium having stored thereon instructions that when executed by a processor perform a method, including:
  receiving a data access request in a controller coupled to (a) a non-volatile memory configured to store a set of physical data pages, and (b) a volatile memory configured to store a plurality of physical data page addresses, wherein each physical data page address corresponding to a physical data page in the set of physical data pages, and each physical data page address is accessed via a corresponding logical address in a set of logical addresses;
  accessing, by the controller based on the received data access request, a bitmap stored on the volatile memory, the bitmap including a set of bits, each bit configured to indicate a validity state of a different plurality of logical addresses in a set of logical addresses; and
  determining, via the controller, a valid state of a logical address by:
    determining the validity state of a bit in a bitmap that represents a selected plurality of logical addresses that includes the logical address; and
    determining the validity state of the logical address in the selected plurality of logical addresses.

* * * * *